3,574,083
APPARATUS FOR THE PRODUCTION OF CHLORINE IN CHLOR-ALKALI DIAPHRAGM CELLS
Bernard B. Pewitt, 11007 Sagewillow Lane,
Houston, Tex. 77034
Filed Nov. 3, 1969, Ser. No. 873,157
Int. Cl. B01k 3/00, 3/10
U.S. Cl. 204—258
13 Claims

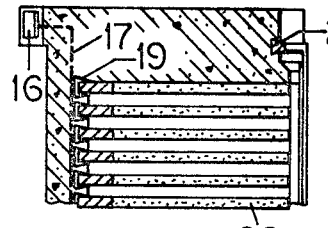 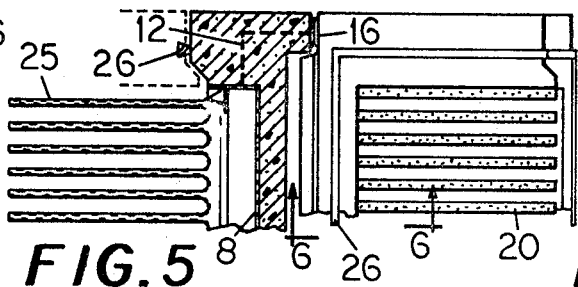 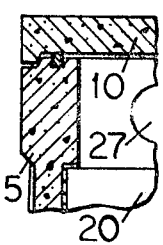
FIG.4  FIG.5  FIG.6
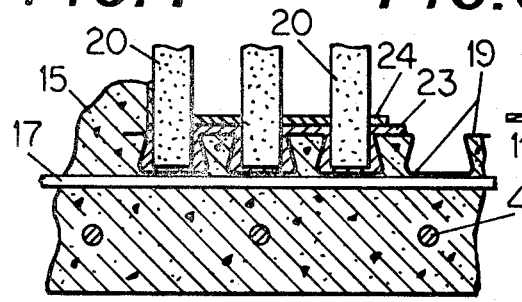 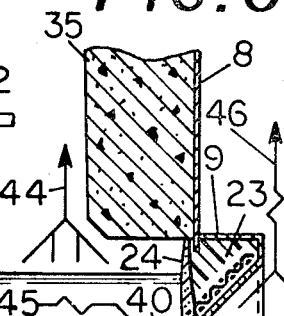
FIG.8  FIG.7
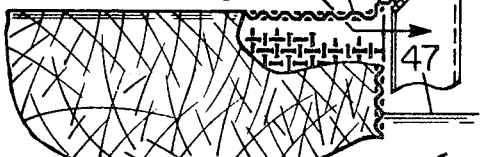
FIG.9
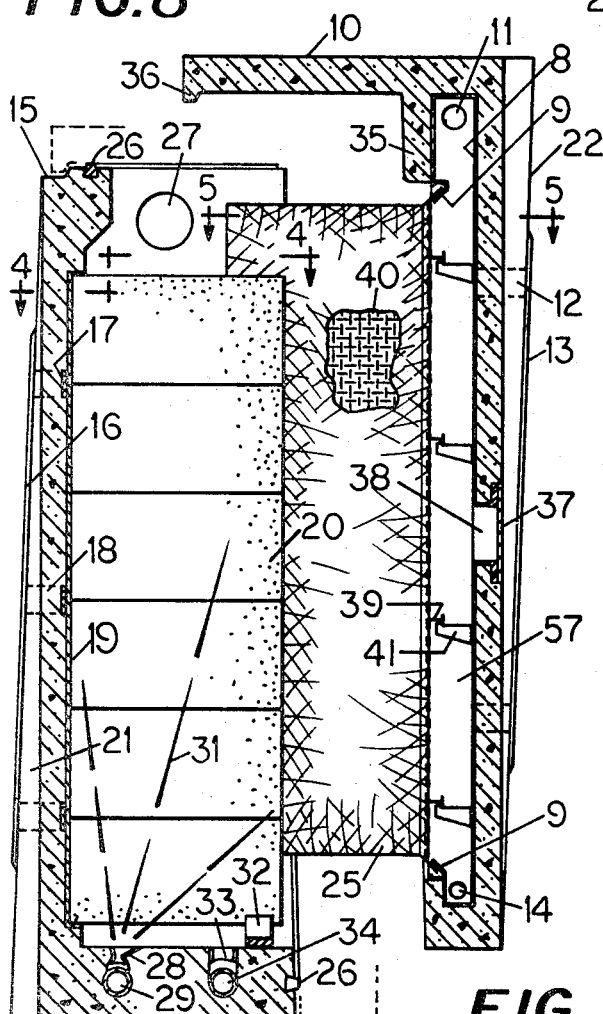 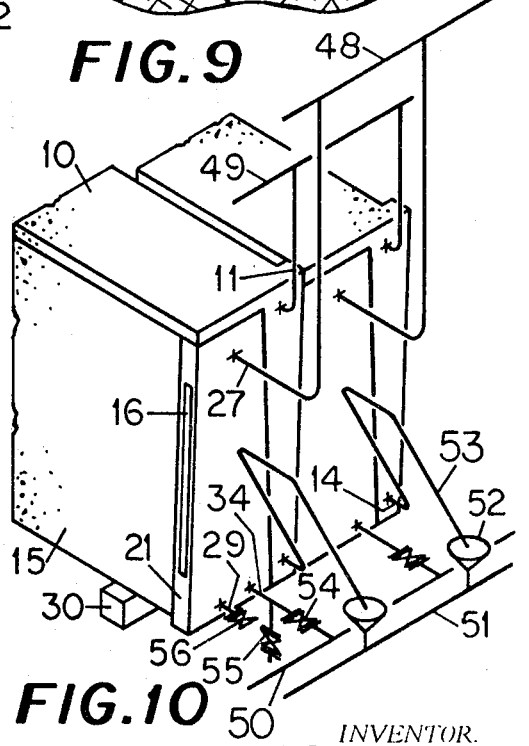
FIG.11  FIG.10
INVENTOR.
Bernard B. Pewitt United States Patent Office 3,574,083
Patented Apr. 6, 1971

ABSTRACT OF THE DISCLOSURE

This invention provides a new and novel arrangement and devices for a chlor-alkali battery wherein the cells are made from prestressed and polymer impregnated concrete for better resistance to chlorine corrosion, and the cells are divided into cathode and anode sections with external electrical contact strips for electrical continuity and arranged so that the cathode sections may be vertically removed from the battery line for replacement or repair of the cathode screen or diaphragm without otherwise disturbing the anode units. The cells, within each battery line, are held together between end members by using corrosion protected steel cables that are stressed and anchored through each end member. In addition the chlor-alkali battery lines may be arranged between canals so that a straddle-barge device may be utilized to place the cells into the battery line and individual cell units may be thus vertically removed and replaced without otherwise disturbing adjacent cells in the chlor-alkali battery line. A cell washing and treating device, including a series of internal spray jets, is incorporated into each cell for treatment to restore permeability of the diaphragms without cell disassembly.

---

This invention relates to an improved method and devices for the production of chlorine in a filter press whereby a series of chlor-alkali diaphragm cells, each comprising one cathode and one anode, are stressed together between end members and held in compression with prestressed steel cables anchored through the end members. Each cathode is arranged within the front and top of a concrete box and each anode is arranged within the back, sides and bottom of a concrete box, so that, when fitted together, each cell becomes a closed box sturcture with external electrical contact strips arranged so that the cathode strip of one cell bears directly on the anode strip of the adjoining cell. Each cathode is arranged with vertical or slightly sloping contact surfaces versus the walls of each matching anode and versus the electrical contact strip on the back of the adjoining anode so that the cathode unit may be vertically removed from the filter press, after relaxation of the holding cables, and without disassembly of the anodes from the line of chlor-alkali cells.

Due to the corrosive attack of chlorine against steel structures and overhead handling equipment, it is intended to arrange the chlor-alkali battery in a line along a concrete foundation with canals adjacent to either side so that a straddle-barge device, with self-contained motive power to lift and convey cell units, may be utilized to pick up cell units from a depot area at the end of the battery line and distribute the cells into position within the chlor-alkali cell line limits. The same procedure will be used for maintenance and repair of the chlor-alkali cells, and the straddle-barge may be moved away from the chlor-alkali battery area, when not in use to minimize corrosion of the component parts that comprise the barge. The water may be pumped out of the canals, if desired, and added back when need for the barge is again required.

In the operation of a typical diaphragm cell, sodium or potassium chloride brine, nearly saturated and at a temperature of 60 to 70° C., is fed into the anolyte, which flows through the diaphragm into the catholyte where alkali is formed. Flow is continuous, with a differential head maintaining flow through the diaphragm. Chlorine gas is formed at the anode and hydrogen gas and alkali are formed at the cathode. The anolyte pH during operation is maintained within a range of 3.0 to 4.0, and the volume of flow of brine from the anolyte through the diaphragm into the catholyte approximately equals the rate of $OH^-$ ion migration from cathode to anode. If the pH is permitted to drop to 1.5 or below, the flow may decrease to one half of normal, but, since the diaphragm separates a strongly alkaline solution from a weakly acid solution, decrease of the flow rate automatically allows the anolyte pH to rise, hence the diaphragms tend to be self-regulating.

Thus, if the initial permeability of the asbestos diaphragm could be maintained, the chlor-alkali diaphragm cell would continue to operate at a high efficiency rate until the graphite anode was exhausted, or up to two years in some chlor-alkali cell designs.

Calcium and magnesium deposits are the chief contaminants decreasing the permeability of the diaphragm. Calcium is deposited as the hydroxide in the interior of the diaphragm during cell operation, and magnesium hydroxide is deposited mainly in the middle layer of the diaphragm. The source of the calcium and magnesium ions may be from the brine, the concrete structure, or from the asbestos of the diaphragm itself. Other contaminants, probably including iron compounds and graphite, cause a sludge deposit to build up on the anode side of the diaphragm. This sludge deposit also tends to be more concentrated toward the bottom of the diaphragm.

It is known, within the art, that the calcium and magnesium hydroxides can be dissolved out of the diaphragm by using any of a great number of organic or inorganic acids, such as hydrochloric, acetic, sulphuric, carbonic or phosphoric acids, but the sludge deposit, referred to in the preceding paragraph, is not greatly affected by these acids. Before my invention, there has been no effective means of removing this sludge deposit without complete disassembly of the individual chlor-alkali cells. Thus, in existing designs, and even with acid treatment within the cells to prolong the life of the diaphragms, it soon becomes necessary to dismantle the cells for removal of the accumulated sludge, or, usually, the removal of the old diaphragm and the vacuum redrawing of a new diaphragm.

Several hundred cell designs have been patented and more than thirty types of diaphragm cells have been in use in the United States. Currently, however, all new diaphragm cells are of two basic types: The Hooker type and the Dow type. These types are similar, the main difference being that the Dow cell incorporates a series of unit cells into a bi-polar filter-press type of cell. Both types have (1) vertical graphite anodes, (2) steel screen cathodes, and (3) deposited asbestos diaphragms.

The Dow bi-polar filter press cell provides a compact unit with large productive capacity per unit floor area, and the investment cost is somewhat reduced because the metal conductors between the anodes on one cell and the cathode of the next cell are reduced to the minimum, as well as the container for electrolyte. This design consists of a series of abutting frames or unit cells each comprising one cathode and one anode. The anode of one unit cell is electrically connected within the cell frames to the cathode of the succeeding unit cell. In one model, the cell operates at 75,000 amperes with 55 four-volt cells in a filter press unit.

The most serious disadvantages of the Dow bi-polar filter press cell are as follows: (1) The complete unit of 55 cells must be dismantled in case any one of the individual units requires repair, (2) there is no effective means of cleaning a clogged diaphragm without disassembling of the affected individual unit, (3) the estimated two-year life of the anodes cannot be utilized due to the number of times that the individual units must be disassembled for cleaning or replacement of the diaphragms and consequent damage to the partially consumed anode graphite blades and back plate, (4) the high cost of machining the fitted juncture between the blades and the graphite back plate, and (5) the high cost of maintenance and repair and frequent interruptions in the production flow of chlorine.

The objects of my present invention are to avoid the technical and economic disadvantages, outlined above, and to provide (1) an outdoor battery comprising one or more lines of chlor-alkali cells, (2) a straddle-barge device arranged for setting and maintenance of each line of chlor-alkali cells, (3) chlor-alkali cells arranged so that the cathodes may be vertically removed from the battery line without otherwise disturbing the anodes, (4) a method to improve the concrete cell structure by plastic polymerization of a vacuum drawn monomer within the concrete, (5) a holding device comprising corrosion-protected steel cables with conical wedge and anchor assemblies arranged to maintain compression on the line of cells stressed between end members, (6) an internal washing device arranged to agitate and remove the accumulation of sludge within the cells, and (7) one or more methods to restore permeability to the cell diaphragms without disassembly of the cells.

Other objects of the invention will be manifest from the following description, taken in connection with the accompanying drawings, wherein.

Figure 1:
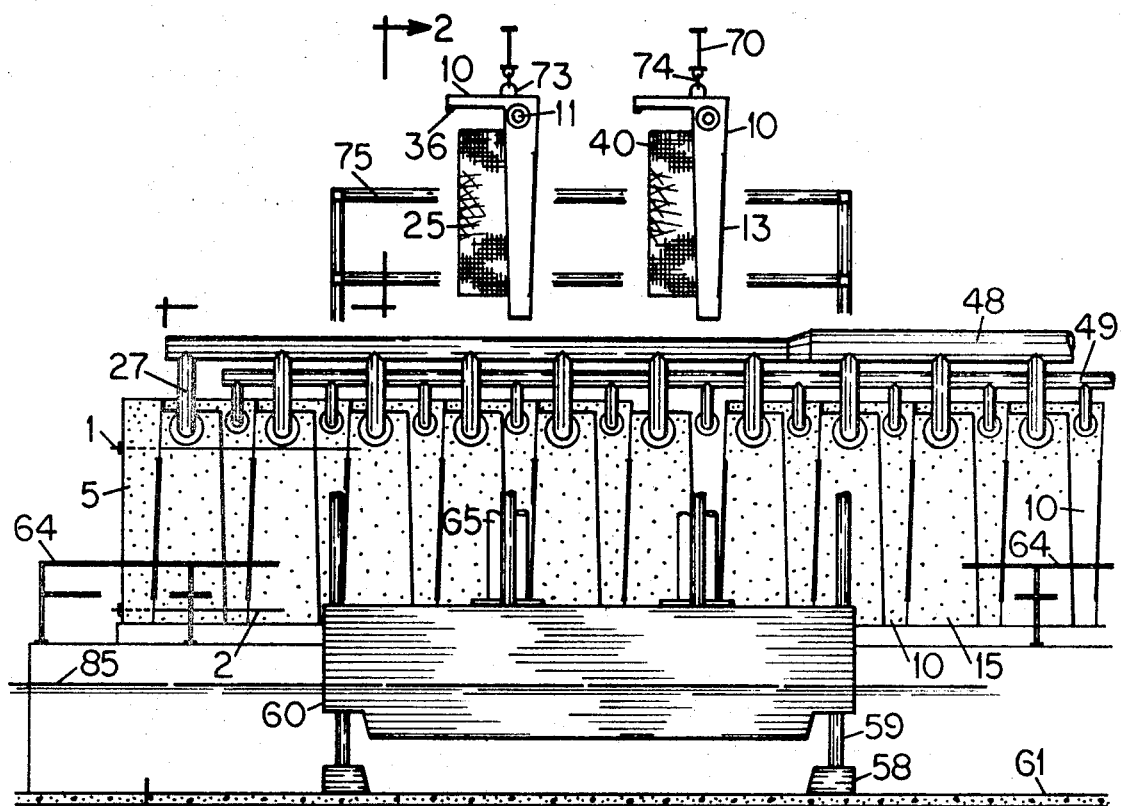
FIG. 1 is an elevation and partial cross-section taken along the line 1—1 of FIG. 2 and illustrates the layout of the cathode and anode members along the battery line with one cathode unit removed and positioned overhead by the straddle-barge device which also holds a replacement cathode.
Figure 2:
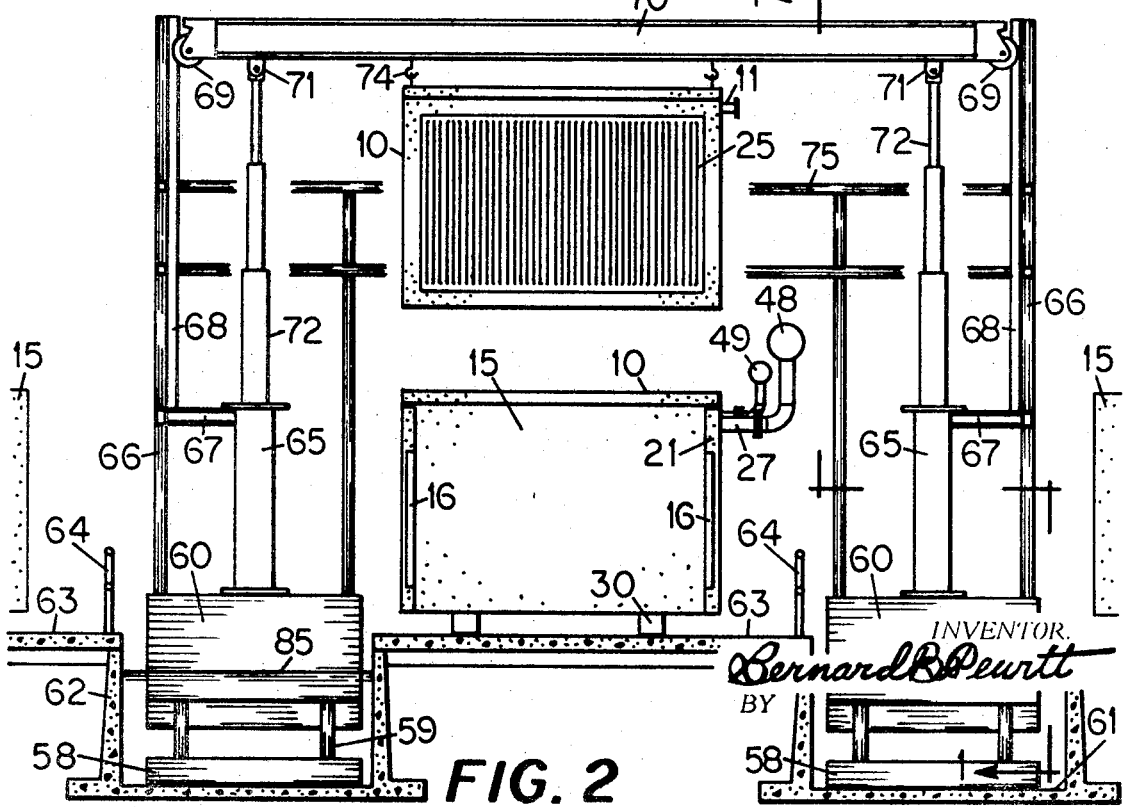
FIG. 2 is an elevation and cross-section taken along the line 2—2 of FIG. 1 and shows a cross section of the canal and battery foundation configuration with an end elevation of the chlor-alkali cell line showing an anode, and an elevation, partially cut away, showing the straddle-barge device in the canals adjacent to the cell line and holding a cathode above the cell line.
Figure 3:
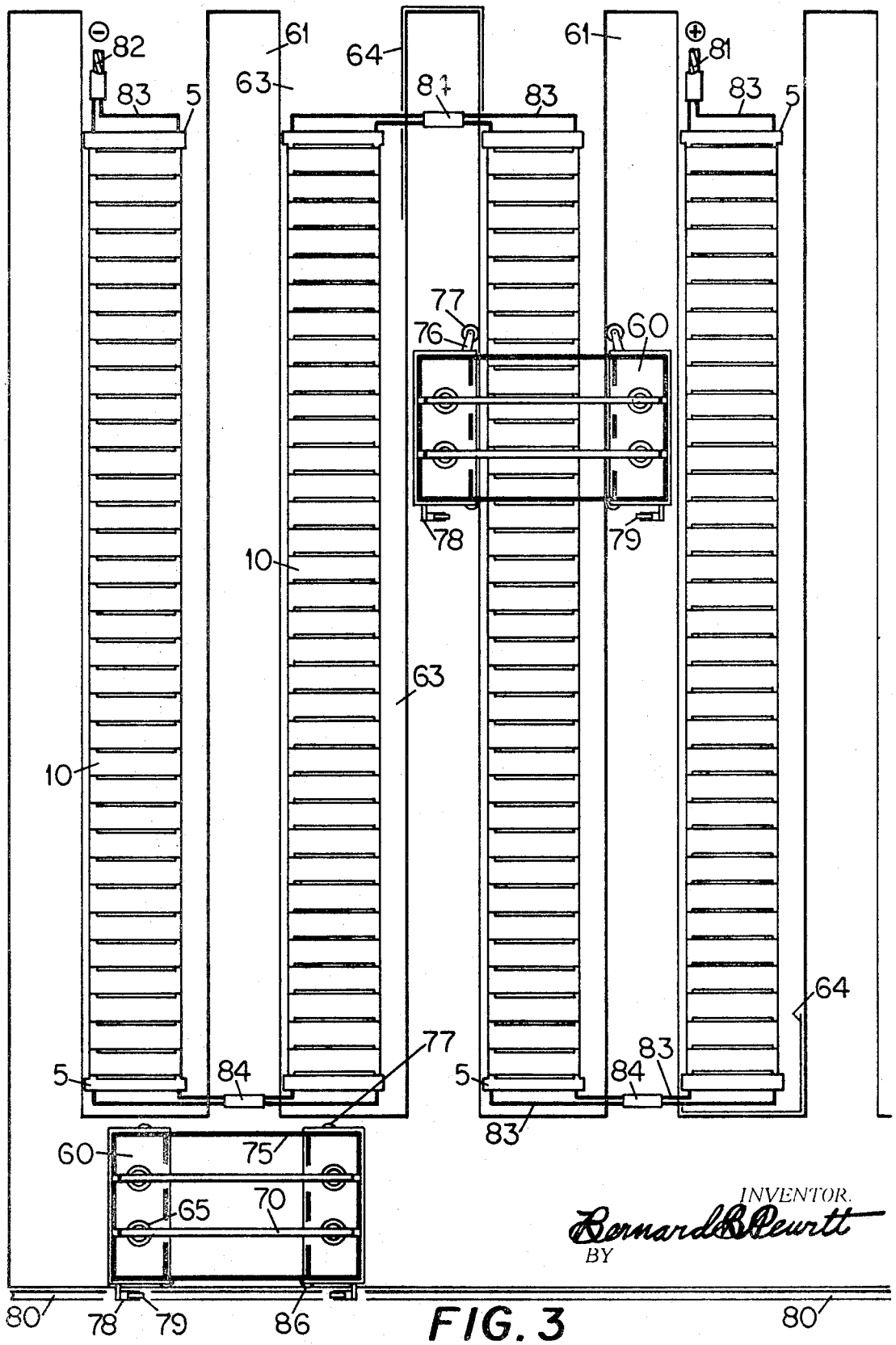

FIG. 3 is a plan view showing the overall layout of a chlor-alkali battery system comprising four lines of chlor-alkali cells arranged with depot areas at one end and with canals on either side for the use of one or more straddle barge devices. One such device is shown straddling the chlor-alkali cell line and the other is shown in the lateral canal that connects into the canals between the cell lines.

FIG. 4 is a partial plan and cross-section taken along the line 4—4 of FIG. 11 and shows the arrangement of the graphite anode blades within the anode cell box structure.

FIG. 5 is a partial plan and cross-section taken along the line 5—5 of FIG. 11 and shows the arrangement of the cathode screen and diaphragm and the peripheral connection of the screen to the catholyte tray that is cast into the cathode cell box structure.

FIG. 6 is a cross-section taken along the line 6—6 of FIG. 5 and shows an alternate arrangement of the corner juncture of the cathode and anode box units so that the cathode may be vertically removed from the anode section.

FIG. 7 is a cross-section through the cell end member and shows the method of stressing and anchoring steel cables to hold the chlor-alkali cells in compression between the end members.

FIG. 8 is an enlarged cross-section showing the arrangement of the anode blades in FIG. 4 with the graphite blades set in the corrugated steel form and held in place with melted and poured lead and sealed for protection against corrosion.

FIG. 9 is an enlarged view of the section in FIG. 11 showing the arrangement of the cathode screen with the diaphragm drawn thereon and the means of making a peripheral seal between the screen and the catholyte tray with melted lead poured into the continuous gutter to retain the screen within said gutter attached to the catholyte tray.

FIG. 10 is a piping isometric showing the arrangement of valves and piping attached to the chlor-alkali cells.

FIG. 11 is a vertical cross-section showing the anode and cathode sections partially assembled together and illustrates the anode blades, the cathode screen and the diaphragm that separates the cell into anolyte and catholyte compartments.

Referring more in detail to the drawings, FIGS. 1, 2, 3, 7 and 11 show details of the chlor-alkali battery system wherein the cathodes 10 and anodes 15 are shown paired together and stressed between the end members 5 with steel cables 1. The cables 1 are run through sleeves 7 and bearing plates 6 in the end members 5 and anchored through the anchor blocks 4 with conical wedges 3. The cables 1 are greased and covered with a PVC tube or other protection to protect against corrosion. The copper contact plate 16 on the anode 15 bears against the copper contact plate 13 on the adjoining cathode 10 to maintain electrical continuity through the battery line. The external plate 16 is connected to the internal anode bed plate 19 and the copper distribution bars 17 with strips 18, and the external plate 13 is connected through the cathode 10 wall with copper strips 12 to the steel catholyte chamber 8. The contact strip 16 is mounted on a slightly inclined surface 21 of the anode 15 to match the contact strip 13 on a correspondingly inclined surface 22 of the cathode 10, but this is a refinement to assist in the vertical removal of the cathode 10 from the chlor-alkali cell line and may or may not be used versus a vertical arrangement of the strips 13 and 16.

Direct current is supplied through cables 81 and 82 to the chlor-alkali battery from an alternating source by silicon or other types of rectification equipment. Cables 83 connect the supply cable 82 through the end member 5 to the cathode 10 on one end of the chlor-alkali battery, said cables 83 connect in series additional lines of chlor-alkali cells, and connect the anode 15 through the end member 5 on the opposite end of the chlor-alkali battery to the supply cable 81. Connectors 84 are arranged so that any line of chlor-alkali cells may be disconnected for maintenance and repair or for service with the straddle-barge device 60; and jumper cables can be used to continue operation of the chlor-alkali battery except for the cell line that has been so disconnected.

The straddle-barge device 60 is a jack barge arranged with supporting members 58 that can be jacked down to the bottom 61 of the canals formed between retaining walls 62 and shown with the waterline 85. With the barge device supported off the canal bottom on vertical members 59, the barge becomes a stable work platform so that cathodes and/or anodes may be installed in the chlor-alkali cell line and also removed and replaced, as required. Since the anticipated weight of the chlor-alkali cells will exceed a unit cell weight of 20,000 pounds, a conventional overhead traveling crane and supporting structure would be quite expensive and the service life would be relatively short due to the corrosive atmosphere that usually surrounds a chlor-alkali cell battery. Also, a specially designed straddle crane that is arranged to run on rails between the cell lines would be expensive and difficult to maintain against chlorine corrosion.

New or replacement cathodes 10 or anodes 15, or a combination of the two, are picked up by the straddle barge device 60 from the depot area at the end of the cell line 63 by means of the hook 74 and eye 73, or other means, and raised by elevating the carrying beam 70 with the telescopic hydraulic cylinder 65 mounted on the straddle barge device 60. The beam 70 is clevis 71 connected to the pistons 72 and is guided on end rollers 69 and guide rails 68. The telescopic cylinders 65 are supported at the top by members 67 and connected to vertical structural frame members 66, and the two barges are bridged and connected together above the cell line with horizontal framing members 75. The straddle barge device 60 is guided along the edge of the concrete walls 62 with corner rollers 86. Longitudinal movement of the barge device 60 straddling the cell line is obtained by using hydraulically actuated arms 76 with rubber tire mountned hydraulic motors 77 that grip and use the surface of the vertical wall 62 for traction to move along the cell line. For lateral movement along the lateral canal and for shifting from one longitudinal canal to another, the straddle barge device 60 is moved into the lateral canal, by using the longitudinal hydraulic motors 77, until the hydraulically actuated arms 78 can partially rotate and fit the rubber tire mounted hydraulic motors 79 into the shallow trench 80 that parallels the continuous side of the lateral canal. With engagement of hydraulic wheel motors 79 into the trench 80, the hydraulic arms 76 are retracted to clear the hydraulic wheel motors 77, and lateral power in the desired direction is obtained by energizing the wheel motors 79. The above procedure is reversed to enter the barge device 60 into the longitudinal canals, and both positions are illustrated in FIG. 3. Handrails 64 are shown around the depot and work areas adjacent to the chlor-alkali cells. With a continuation of the lateral canal to an off-site location, not shown on the drawings, the straddle barge device 60 can be removed from the immediate area of the chlor-alkali battery system, and the water can be drained from the canal, if desired, and added back when required. Thus a new and novel tool has been devised for complete installation and servicing of a high capacity outdoor chlorine battery.

In conjunction with FIGS. 4, 5, 6, 8, 9 and 11, the construction of the chlor-alkali cell is further disclosed, wherein the anode 15 is shown as the back, bottom and sides of a concrete structure with graphite anode blades 20 held along one edge within the corrugated and reverse drafted metal member 19, which is cast into the back concrete wall. In practice, the concrete cell structure will be made in a prestressed concrete stressing bed with prestressing steel 42 and with the corrugated plate 19 in place and connected with the copper strips 17 either behind or through the corrugations of the plate 19. The copper strips 17 are connected to the external bearing strips 16 with connecting bars 18, and the concrete is poured into the cell form with arrangement made for the peripheral gasket 26. After casting and curing of the concrete, the cells are placed in a vacuum chamber and soaked in a monomer such as methyl methacrcylate or any other suitable liquid monomer. After removal of the cells from the vacuum chamber and treatment with a suitable chemical catalyst, the cell structures are heated with steam, or other means, until the monomer has been polymerized on the surface and within the concrete. Tests have shown that concrete, so treated, is highly resistant to the effects of chlorine.

After polymerization of the concrete cell structure, the cell is positioned with the corrugated plate 19 level, the graphite anode blades 20 are positioned therein with the plastic spacer bar 32 and other means and molten lead 23 is poured to fill the reverse drafted corrugations of the back plate 19 and completely cover said plate 19 thus gripping the edges of the graphite anode blades 20 both electrically and mechanically. The copper strips 17 may be brazed to the back of the corrugated plate 19 and cast within the concrete or may be inserted through the corrugations and covered simultaneously with the edge of blades 20 with molten lead 23. After the lead has cooled, the surface is sealed and further protected against corrosion from the brine or chlorine with a molten asphaltic material. An epoxy material can be used to seal the lead surface, but it is considerably more expensive than asphalt.

The cathode cell box 10 is arranged as the front and top of a box and bears against the peripheral gasket 26 on the anode structure 15 to make a watertight container when stressed between the end members 5. The catholyte compartment 8 is a steel box open on one side with a peripheral gutter 9 arranged around the opening. The compartment or tray 8 is cast within a precast and polymerized concrete structure in a method similar to that already described for the anode structure 15 above, and the cathode structure 10 is arranged for further assembly with the peripheral gutter looking up and in a level position. The cathode screen 40 is folded to interleaf between the anode blades as shown in FIGS. 5, 9 and 11, arranged with supporting members 39 and fitted peripherally into the steel gutter 9 with the screen supporting members 39 engaged or resting on the support members 41 that are welded to the back of the catholyte tray 8. All edge openings of the screen 40, such as top and bottom of the folded screen, are welded wire to wire, and molten lead 23 is poured to fill the gutter 9 and peripherally grip the edge of the cathode screen 40. The gutter 9 is arranged with a projecting ledge to prevent withdrawal of the molten lead 23 seal and the anolyte side of the lead 23 seal is covered with melted asphaltic material for further protection of the lead joint 23.

After inspection to assure that there are no openings in the screen 40 larger than the mesh size of the screen, the plate 37 is removed and a vacuum source is connected to the cathode 10. The cathode 10 is then immersed, with openings 11 and 14 closed, into a tank containing a slurry consisting of cell liquor and asbestos with small additions of portland cement or other additives to improve the characteristics of the diaphragm. The slurry is vacuum drawn through opening 38 in the cell and causing the asbestos fibers to coat and cling to the anolyte side of the screen 40 thus forming the permeable asbestos diaphragm 25 that separates the cell into separate anolyte and catholyte compartments. After removal of the vacuum source from the cell and replacement of the plate 37, the diaphragm 25 is inspected for uniformity of coating and removal of lumps and the cell is oven dried to harden the asbestos diaphragm. The use of an asbestos diaphragm in a chlor-alkali cell is considered to be within the public domain, but my method of drawing a diaphragm on a cathode screen that is attached to an enclosed catholyte compartment within the cathode cell structure is considered to be new and patentable.

Now considering FIGS. 9, 10 and 11, it will be seen that the differential head between the anolyte level 43 and the catholyte level 47 will cause flow of the electrolyte in the direction of the arrow 45 through the diaphragm 25 and the cathode screen 40. Under ideal operating conditions, the input of heated pH controlled salt brine electrolyte into the cell box must equal the total withdrawal of alkali enriched cell liquor through the catholyte compartment opening 14 and through the siphon 53 in order to maintain the desired level of anolyte 43 as illustrated in FIG. 9. As the permeability of the diaphragm 25 decreases, flow may be maintained for a time by lowering the siphon 53 and thus increasing the differential pressure between the anolyte liquid level 43 and the catholyte liquid level 47. Thus, if the ideal level between level 43 and level 47 was 5 inches, this might be increased progressively to as much as 20 inches to maintain flow through the diaphragm 25. However, when the flow can no longer be maintained in this manner, the cell is shut down for rejuvenation or replacement of the diaphragm.

The arrow 44 shows the direction of accumulation of chlorine over the anolyte surface 43, and the arrow 46 shows the direction of accumulation of hydrogen above the catholyte level 47 in the catholyte chamber 57. The beam 35 is arranged to provide an area above the diaphragm 25 for the accumulation of chlorine which exits the cell through opening 27. The projection 36 is provided on the cathode structure 10 to hold the cathode 10 and the anode 15 together until positioned and stressed in the cell line. FIG. 6 shows an alternate in the cell structure for full clearance of the cathode fingers 40 for vertical removal from the cell line. If intended to be removed from the side, as shown in FIG. 11, the structure may be made as shown therein.

In FIG. 10, the heated and pH controlled salt brine electrolyte is fed into the cell anolyte chambers through the pipeline 50, the valves 54 and the pipes 34 from a supply tank, not shown, with a controlled tank level to maintain the anolyte level 43 within the cells. A certain volume of cell liquor is continuously withdrawn from the catholyte compartment 57, through the opening and pipe 14, the siphon 53 and into the visual sight funnel 52 that connects into the cell liquor drain pipe 51. The volume of withdrawn cell liquor is controlled by raising or lowering the siphon 53 which controls the differential head between the anolyte level 43 and the catholyte level 47. Chlorine gas exits the anolyte compartment through the opening and pipe 27 into the gathering system pipe 48, and hydrogen gas exits the catholyte chamber 57 through the opening and pipe 11 and into the gathering system pipe 49.

When the flow of electrolyte through the cells can no longer be maintained by lowering the siphon 53, as above described, the cell line is shut down, electrically disconnected from the direct current source, and arranged for rejuvenation or replacement of the diaphragms by one or more of the following methods:

(1) After closing the valve 54, connected to the electrolyte supply line 50, the cell is drained by opening valve 55 and the siphon 53 is removed from the catholyte drain pipe 14. Now, an aqueous acid solution source line is connected to valve 55 and the anolyte compartment is flooded and maintained at the normal anolyte level 43, with the acidized water percolated through the diaphragm and drained from the catholyte space 57 through the drain line 14 until the pH value of the subsequent wash water indicates that magnesium and calcium hydroxides have been dissolved out of the asbestos diaphragm, thus restoring permeability thereto.

(2) To remove sludge and insoluble contaminants that accumulate in the anolyte space, the cell is drained as disclosed in (1) above, a medium pressure water line is connected to valve 56 and water is forced through the line 29 and out through the series of venturi jets 28 to cause a swirling and upward mixing motion through the rising level of wash water in the cell, thus dislodging sludge and contaminants that have accumulated mainly on the anolyte side of the diaphragm. Valve 55 is now opened and the slurry is drained from the cell through opening 33 while maintaining sufficient volume of flow through valve 56 to keep the slurry in suspension as it drains from the cell.

(3) The methods above may be modified so that an acidized water solution is pumped through the valve 56, through the line 29 and the jets 28 in the spray pattern 31 until the pH value of the wash solution percolated through the diaphragm and out of the catholyte drain 14 indicates that hydroxide contaminants have been removed. Now valve 55 is opened and wash water is pumped through the valve 56 and jet assembly 28 until clean wash water exits openings at line 14 and through the drain valve 55, indicating a clean and permeable diaphragm.

(4) When there is either a gradual or abrupt drop in the pH value of the catholyte liquid in a cell, this indicates that the slightly acid anolyte is draining into the catholyte through a break in the diaphragm or in the cathode screen. When this occurs, the cell must be disassembled for repair or replacement of the diaphragm and/or cathode screen. My invention is arranged so that the affected cathode may be removed and replaced without otherwise disturbing the matching anode, as already disclosed.

The above valves, fittings, jets and pipe in contact with salt brine or chlorine gas are made from polyvinyl chloride or similar material, and ordinary steel pipe and fittings are used for handling hydrogen gas and alkaline cell liquor.

It is also intended to use the method and devices disclosed in United States Patent 3,491,431, Method and Devices for Post-Tensioning Concrete and Structural Materials, for reference, specification and certain claims in this application, with respect to the cable stressing of a chlor-alkali battery arranged in a line on members 30 and between end members 5.

From the foregoing, it will be seen that the present invention affords a novel apparatus, methods and devices for the production of chlorine in an improved chlor-alkali diaphragm cell system. Also, it will be seen that the present invention affords a novel means and devices for washing the diaphragms without disassembly of the chlor-alkali cells, and permits the removal and replacement of the cathode screens and diaphragms without removal of the longer lived anodes from the chlor-alkali cell line.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. An apparatus for the electrolyte production of chlorine comprising a line of closed box chlor-alkali cells with matching external cathode an anode electrical contact strips to maintain electrical continuity from cell to cell, each cell comprising an anode holding part comprising the bottom, back and sides with the back holding a plurality of vertical graphite anode blades, and a cathode holding part comprising the front and top of the closed box structure with a vertical and mesh supported diaphragm connected across the box front and interleafed between said anode blades thus separating the anolyte and catholyte compartments, said cathode holding part being readily separable from said anode holding part, said anode blades being supported within a grooved and lead filled metal frame attached to the back wall of the cell and with electrical connection to said external anode contact strip, said interleafed diaphragm being supported and sealed with a lead filled continuous gutter formed around the metal catholyte chamber cast within the front cell wall and with electrical connection from said catholyte chamber to said external cathode contact strip, a means to feed brine into the anolyte side of the cell, and means to apply a potential difference between said anodes and cathodes and means to separately remove chlorine gas, hydrogen gas and alkali enriched cell liquor from each individual cell box in the line of cells.

2. The apparatus of claim 1 wherein the anode and the cathode holding parts are comprised of concrete coated with a chlorine resistant plastic polymer.

3. The apparatus of claim 1 further comprising a system of canals alternating between said lines of cells, with a straddle-barge device arranged for pontoon support and flotation in said canals on each side of the line of cells, a mechanical means on the barge to lift and convey said cells into initial position to form the line of cells, and also a means to remove faulty individual cathode or anode sections and replace said sections with new units.

4. The apparatus of claim 3 further comprising a twin pontooned unit with means to jack down for support off the canal bottom, means to lift any individual cathode or anode cell box above the line of cells, and means to traverse longitudinally along the line of cells and shift laterally at the end thereof from one cell line to another.

5. The apparatus of claim 1 further comprising a washing device consisting of an external valve connected to a conduit with a series of venturi jets connected in line along said conduit and with said conduit and jet assembly imbedded within the floor of the chlor-alkali cell, whereby treating fluids may be forced through the valve, conduit and jet assembly to cause a swirling and upward mixing motion through the cell liquor or wash water in the cell thus dislodging the sludge accumulated in the bottom portion of the cell and causing said sludge to exit the cell through the opened drain.

6. The apparatus of claim 5 further comprising a means for forcing carbonated or acidized water under pressure into the anode side of the chlor-alkali cell, said carbonated or acidized water reacting with and removing magnesium and calcium hydroxides from the diaphragm, thus restoring permeability to said diaphragm.

7. The line of cells of claim 1, said cells being held together between end members having openings therethrough and with corrosion protected steel cables running through said openings and said cables being tensioned and anchored at each end to maintain compression on the line of chlor-alkali cells.

8. The apparatus of claim 1 further comprising a plurality of graphite anode blades equally spaced along and held within a corrugated metal form that has a reverse drafted configuration with said configuration filled with lead to grip one edge of said anode blades, said metal form and graphite blades being peripherally encased in a concrete form comprising the bottom, sides and back of a box with said metal form being attached to the back of said box and with conductive metal strips attached to said metal form, through the concrete box back, and connected to electrical contact strips on the external surface thereof.

9. The apparatus of claim 8, further comprising a plurality of wire cloth fingers arranged to interleaf with the anode blades and formed by folding or pleating a continuous strip of wire cloth and welding the open edges at top and bottom to form said fingers, said finger unit being peripherally joined to a catholyte tray around the open side, said tray being partially encased in a concrete form consisting of the front and top of a concrete box and with electrical connections between said catholyte tray and external electrical strips, a means for connection of said catholyte tray to an external vacuum source, with an asbestos diaphragm thus being vacuum drawn to cover the anolyte side of said wire cloth fingers and adjacently joining filter areas.

10. The apparatus of claim 9 further comprising a plurality of box cells between end members, with peripheral gaskets between anode and cathode joining surfaces, with said cells stressed together between said end members to maintain electrical continuity from cell to cell and to maintain a watertight connection within said cells, a means to feed brine into the anolyte side of the cells, and means to apply a potential difference between said anodes and cathodes and means to separately remove chlorine gas, hydrogen gas and alkali enriched cell liquor from each cell box in the chlor-alkali battery line.

11. The apparatus of claim 1 further comprising a plurality of closed box cells electrically connected and stressed together between end members, with each closed box cell comprising an anolyte section containing vertical graphite anodes and combined with a catholyte section including a folded wire screen cathode arranged to interleaf into each interstice between anode blades and with an asbestos diaphragm vacuum drawn on the anolyte side of said cathode screen thus dividing said cells into anolyte and catholyte chambers, a means to feed brine into the anolyte side of the cells whereby said brine percolates through the diaphragm into the catholyte side, a means to apply direct current to each end of the chlor-alkali battery line, and means to separately remove chlorine gas, hydrogen gas and alkali enriched cell liquor from each cell box in the chlor-alkali battery line.

12. The apparatus of claim 11 further comprising a holding device to maintain compressive force on a line of chlor-alkali cells arranged between end members and comprising wire cables inserted through opposing openings in said end members, through conical openings provided in anchor members and through conical wedges, utilizing a stressing means to elongate said cables through the anchor members for a prescribed elongation and a means to ram the conical wedges around the cables and into the conical openings in the anchor members, thus holding said cables under tension between said cell end members and thus maintaining compressive force on the line of chlor-alkali cells.

13. The apparatus of claim 11 further comprising a line of closed box cells with external electrical connections arranged to match back-to-back from each anode to adjoining cathode, said cells being arranged between end members with electrical connections thereon matching an anode connection with one end member and a cathode connection with the other end member, utilizing corrosion protected stressing cables run through sleeves in each end member, and a means to stress and anchor said cables through the end members to maintain said electrical connections in equal compression through the chlor-alkali battery line.

References Cited

UNITED STATES PATENTS

| | | | |
|---|---|---|---|
| 1,002,989 | 9/1911 | Heltzen | 204—258 |
| 1,172,932 | 2/1916 | Bucknam | 204—258 |
| 1,741,290 | 12/1929 | Dupire | 204—266X |
| 1,797,377 | 3/1931 | Smith | 204—266 |
| 2,944,956 | 7/1960 | Blue et al. | 204—266 |
| 3,344,053 | 9/1967 | Neipert et al. | 204—266 |
| 3,375,184 | 3/1968 | Giacopelli | 204—225 |
| 3,527,688 | 9/1970 | Giacopelli | 204—242 |

JOHN H. MACK, Primary Examiner

A. C. PRESCOTT, Assistant Examiner

U.S. Cl. X.R.

204—263, 266